(12) United States Patent
Gidon

(10) Patent No.: US 7,697,402 B2
(45) Date of Patent: Apr. 13, 2010

(54) DATA RECORDING DEVICE COMPRISING A DIAPHRAGM-TYPE SUPPORT

(75) Inventor: Serge Gidon, La Murette (FR)

(73) Assignee: Commissariat a l'Energie Atomique, Paris (FR)

( * ) Notice: Subject to any disclaimer, the term of this patent is extended or adjusted under 35 U.S.C. 154(b) by 1198 days.

(21) Appl. No.: 10/528,065

(22) PCT Filed: Oct. 1, 2003

(86) PCT No.: PCT/FR03/02879

§ 371 (c)(1), (2), (4) Date: Mar. 15, 2005

(87) PCT Pub. No.: WO2004/032132

PCT Pub. Date: Apr. 15, 2004

(65) Prior Publication Data

US 2005/0269653 A1 Dec. 8, 2005

(30) Foreign Application Priority Data

Oct. 3, 2002 (FR) .................................. 02 12275
Jul. 1, 2003 (FR) .................................. 03 07965

(51) Int. Cl.
*G11B 9/00* (2006.01)
*G11B 3/70* (2006.01)

(52) U.S. Cl. ....................... 369/126; 369/287
(58) Field of Classification Search ................. 369/126, 369/101
See application file for complete search history.

(56) References Cited

U.S. PATENT DOCUMENTS 3,502,455 A 3/1970 Gardiner
3,646,533 A * 2/1972 Rosenblum .................. 360/135

(Continued)

FOREIGN PATENT DOCUMENTS

DE 1 449 904 4/1969

(Continued)

OTHER PUBLICATIONS

Vettiger et al., "The "Millipede"—More than one thousand tips for future AFM data storage," IBM J. Res. Develop., vol. 44, No. 3, pp. 323-340, May 2000.

(Continued)

*Primary Examiner*—Peter Vincent Agustin
*Assistant Examiner*—Aneeta Yodichkas
(74) *Attorney, Agent, or Firm*—Oliff & Berridge, PLC

(57) ABSTRACT

The invention concerns a data recording device comprising a two-dimensional array of microtips (3), whereof the apex is generally of nanometric dimensions arranged opposite a storage medium consisting of a flexible diaphragm (2) borne by a frame (1) forming a plurality of cells. At least one microtip (3) is associated with each cell. Said device enables the dispersion in the height of the microtip to be compensated. In order to eliminate edge effects, the flexible diaphragm (2) may include first and second elementary diaphragms, separated by a network of spacer elements, laterally offset relative to the frame. In an alternative embodiment, an array of flexible plates, separated from the diaphragm by a two-dimensional array of spacer studs, may be used for subdividing each large-size cell into a plurality of elementary cells, each associated with at least one microtip.

19 Claims, 8 Drawing Sheets

U.S. PATENT DOCUMENTS

| | | | | |
|---|---|---|---|---|
| 4,451,914 A | * | 5/1984 | LaBudde et al. | 369/121 |
| 5,204,581 A | * | 4/1993 | Andreadakis et al. | 313/336 |
| 5,216,631 A | | 6/1993 | Sliwa, Jr. | |
| 5,581,537 A | | 12/1996 | Yamano et al. | |
| 5,835,477 A | * | 11/1998 | Binnig et al. | 369/126 |
| 6,084,849 A | * | 7/2000 | Durig et al. | 369/126 |
| 6,579,742 B2 | * | 6/2003 | Chen | 438/99 |
| 2002/0094435 A1 | | 7/2002 | Artmann et al. | |
| 2004/0125733 A1 | * | 7/2004 | Lee et al. | 369/101 |

FOREIGN PATENT DOCUMENTS

| | | |
|---|---|---|
| FR | 1 519 660 A | 4/1968 |
| WO | WO 89/08489 | 9/1989 |
| WO | WO 00/36608 | 6/2000 |

OTHER PUBLICATIONS

Lee et al., "Fabrication of microprobe array with sub-100nm nano-heater for nanometric thermal imaging and data storage," Technical Digest, MEMS 2001, 14$^{th}$ IEEE International Conference on Micro Electro Mechanical Systems (Cat. N°01CH37090), IEEE, Piscataway, NJ, USA, pp. 204-207, 2001.

Moreau et al., "Procedes de fabrication de micropointes en silicium," Le Vide, n°282, Oct.-Dec. 1996, pp. 463-477, ISSN 1266-0167.

Oesterschulze, "Novel probes for scanning probe miscroscopy," Applied Physics A 66, S3-S9, 1998.

Mihalcea et al. "Fabrication of monolithic diamond probes for scanning probe microscopy applications," Applied Physics A 66, S87-S90, 1998.

* cited by examiner

DATA RECORDING DEVICE COMPRISING A DIAPHRAGM-TYPE SUPPORT

BACKGROUND OF THE INVENTION

The invention relates to a data recording device comprising a two-dimensional array of microtips, the apex whereof is generally of nanometric dimensions, arranged in a plane facing a storage medium, and electronic means for addressing and controlling the microtips so as to enable data recording on the storage medium.

STATE OF THE ART

Data recording, both in the computing field and in the multimedia field, has to meet an increasing need for capacity. Different techniques have been developed ranging from the magnetic hard disk to the DVD using optics and phase change materials. Whatever the recording technique used, it is always sought to reduce the size of the memory points (bits) and increasing the recording capacity means increasing the storage density.

Recently, very large storage capacities, of about a Terabit/$cm^2$, have been obtained by implementing micro-tips of the type used in the tip effect microscopy field ("The Millipede— More than one thousand tips for future AFM data storage", P. Vettiger et al., IBM J. RES. Develop., Vol. 44, n°3, May 2000, p. 323-340 and "Fabrication of microprobe array with sub-100 nm nano-heater for nanometric thermal imaging and data storage", Dong-Weon Lee et al., Technical Digest, MEMS 2001, 14$^{th}$ IEEE International Conference on Micro Electro Mechanical Systems (Cat. N°01CH37090), IEEE, Piscataway, N.J., USA, 2001, p. 204-207). High density is obtained by localizing the bits by means of micro-tips the apex whereof is of nanometric dimension. The micro-tips are preferably arranged in an array, with a parallel access to the data, which enables excellent performances to be achieved as far as rate is concerned. A single actuator, which may be electromechanical, enables a relative monolithic movement of the whole of the array of micro-tips with respect to the surface of the storage medium.

In such a data recording device, with tip effect, it is necessary to guarantee a perfect contact of all the tips with the storage medium. For reasons of complexity of the system, it is not envisageable to control the position of each microtip individually. However, the microtips are fabricated in collective manner, by techniques derived from those of microelectronics, and a dispersion of the height of the microtips always remains due to fabrication. Although this dispersion is very small, typically about 100 nm, the longest of the microtips of an array presses more than the others on the storage medium.

To overcome this difficulty, each microtip is borne overhanging by one end of a cantilever, in similar manner to the microtip arrays used in local probe microscopy. The flexibility of the cantilever then enables the strain of a bearing to be absorbed.

However, the bearing forces of the microtips on the storage medium must not exceed a value of about 100 nN, so as not to damage the storage medium. Indeed, as the contact surface of a microtip with the storage medium is minute, the pressure is high. The cantilevers therefore have to be very flexible to absorb the height dispersion of the microtips. For example, cantilevers having a stiffness of about 1 N/m, a length of 100 µm, a width of a few tens of µm and a thickness of a few µm have been developed. It is difficult to envisage more flexible cantilevers. Their dimensions are in fact difficult to master due to their large length in comparison with their small width and/or thickness. In addition, the positioning precision of the tips facing the surface of the storage medium would be adversely affected, thus limiting the memory density.

OBJECT OF THE INVENTION

The object of the invention is to achieve a data recording device not presenting the above shortcomings and more particularly enabling the heightwise dispersion of the microtips to be ignored.

According to the invention, this object is achieved by the fact that the storage medium comprises a flexible diaphragm borne by a frame forming a plurality of cells, at least one microtip being associated with each cell. This frame enables a rigidity of the diaphragm to be ensured while ensuring it a freedom of movement inside each cell.

According to a development of the invention, two arrays of microtips are arranged on each side of the storage medium.

The two arrays of microtips are preferably laterally offset so that the microtips associated with any one cell of the frame are not arranged exactly opposite one another.

According to a preferred embodiment, the flexible diaphragm comprises at least a first layer, performing the function of a memory, and a second layer designed to ensure a certain rigidity.

According to another development of the invention, the flexible diaphragm comprises first and second elementary diaphragms separated by an array of spacer elements laterally offset with respect to the frame. This enables undesirable edge effects to be eliminated.

In another alternative embodiment, also enabling edge effects to be limited, the device comprises an array of flexible plates, separated from the diaphragm by a two-dimensional array of spacer studs and sub-dividing each cell into a plurality of elementary cells each associated with at least one microtip.

The device preferably comprises means for relative movement of the storage medium and of the microtip array in parallel to, and possibly perpendicularly to said plane.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
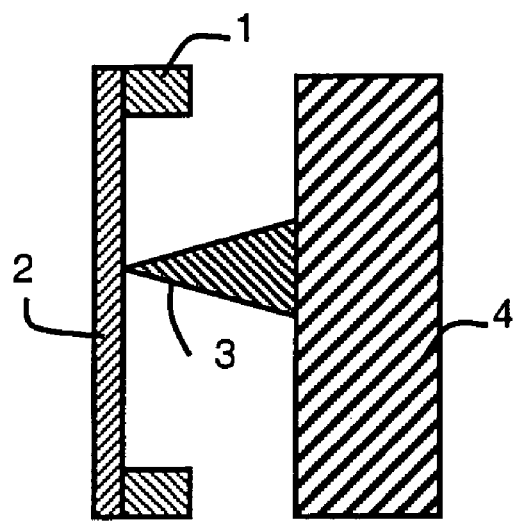
FIG. 1 illustrates, in cross-section, a basic element of a device according to the invention.

As represented in FIG. 1, a basic element of the data recording device comprises a frame 1 bearing, on one of its faces, a flexible diaphragm 2 constituting the storage medium. Each basic element forms a cell associated with a microtip 3 formed on a base 4 arranged facing the storage medium, parallel to the latter.

Figure 2:
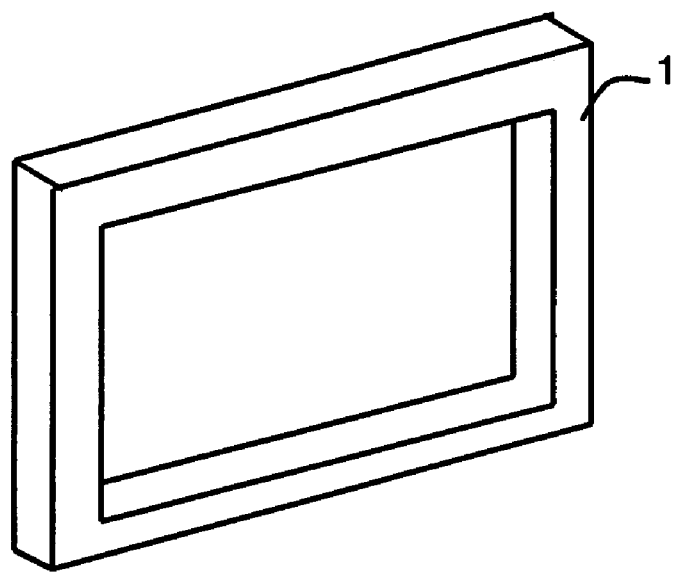
FIG. 2 represents, in perspective, a particular embodiment of a support frame of a diaphragm of a basic element according to FIG. 1.
Figure 3:
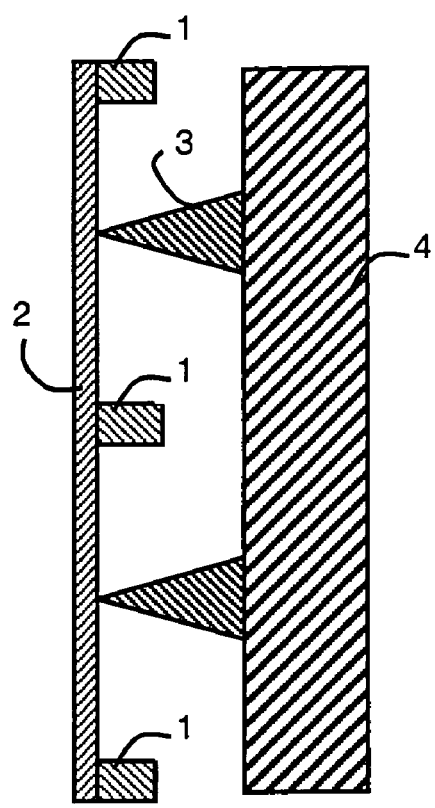
FIG. 3 represents, in cross-section, two adjacent cells of a device according to the invention.
Figure 4:
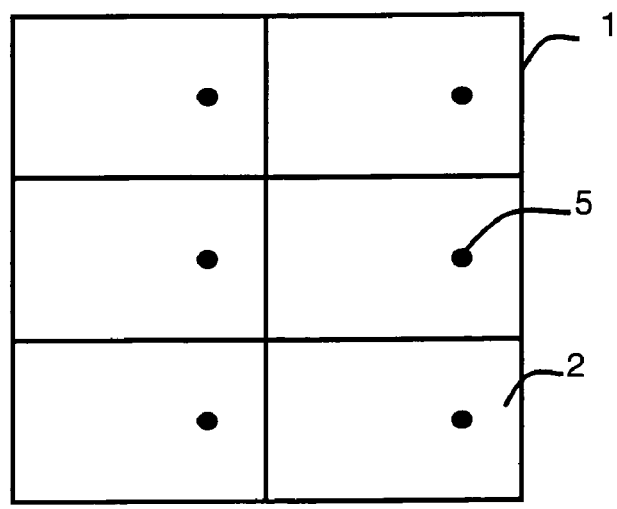
FIGS. 4 and 5 represent, in front view, two alternative embodiments of a device according to the invention.
Figure 5:
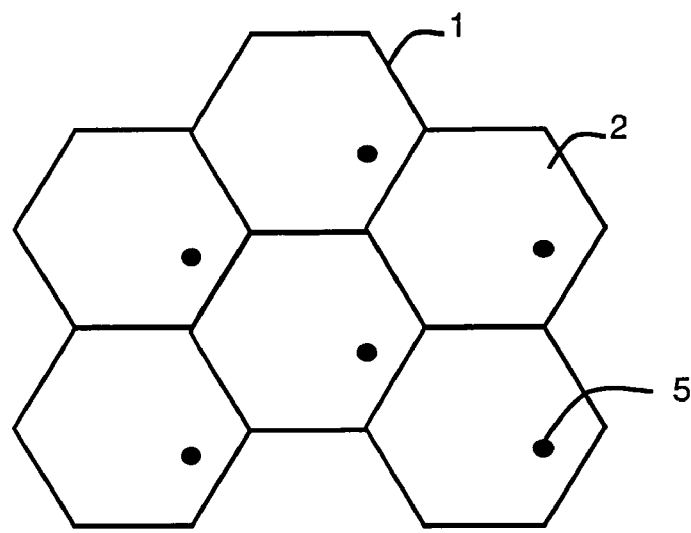

A data recording device comprises a plurality of adjacent cells associated with a two-dimensional array of microtips (FIGS. 3 to 5). FIGS. 4 and 5 illustrate two particular configurations able to be used, with cells respectively of rectangular shape (FIGS. 2 and 4) and of hexagonal shape (FIG. 5).

In the rest position, the microtips 3 can be either in contact with the flexible diaphragm 2 or withdrawn with respect to the latter. In the latter case, in the read or write position, the storage medium is moved perpendicularly to the base 4 so as to bring the microtips 3 into contact with the storage medium formed by the flexible diaphragm 2. The relative movement of the storage medium and of the microtips perpendicularly to their plane is preferably achieved by movement of the support frame 1 of the diaphragm, the base 4 on which the microtips 3 are formed remaining fixed.

A relative movement of the microtips 3 and of the storage medium, in a direction parallel to the plane of the flexible diaphragm, with or without contact with the latter, can also be communicated to the diaphragm and/or to the microtips by actuators (not shown), themselves controlled by a microcomputer.

Control and addressing or multiplexing of the microtips 3 in the read or write position is performed by any suitable means, preferably by an electronic circuit achieved by means of integrated technology in the base 4. The microtips 3, which are fixed, can then be achieved by microelectronics techniques on silicon. The whole surface of the base 4 situated facing the storage medium is in fact available for the electronic addressing and control circuit of the microtips, which does not have to be removed to the end of the memory as in a number of prior art devices. This enables the silicon surface used to be optimized. In the case of an electrical memory, a current has to flow from the microtips to the electrically conducting diaphragm, the latter then being connected by an electrical connection (not shown) to the electronic circuit arranged in the base 4.

The flexible diaphragm 2 is formed by a layer with an extremely small thickness, from about a few nanometers to a few micrometers, which can be conducting. It therefore deforms under the action of a local force perpendicular to its surface. For example, it can be shown that, under the action of a centered force of 100 nN, a diamond-like carbon layer with a thickness of 10 nm, tightened on a frame having dimensions (side, diameter, etc.) of about 100 µm, deforms with a sag of about 12 µm, which corresponds to an equivalent stiffness of only 8.3 nN/µm, i.e. more than two orders of magnitude less than that of conventional cantilevers. It is easy to adjust this stiffness constant by choosing a layer with a more or less large thickness, the stiffness being proportional to the cube of the thickness of the diaphragm.

This low value of the stiffness constant allows a large height dispersion of the microtips 3 without resulting in large bearing forces. In the above example, a height variation of the microtip of 100 nm only represents a variation of the bearing force of 0.83 nN, i.e. less than 1% of a nominal bearing of 100 nN. All the height dispersions of the microtips due to the fabrication technologies then do not have any influence in comparison with the amplitude of an imposed mean deformation of the diaphragm, i.e. 12 µm in the example above.

In FIGS. 4 and 5, the bearing points of the flexible diaphragm 2 of the microtips 3 associated with each cell of the frame 1 are represented in 5. These impact points are not arranged at the center of each of the cells but are off-center, the frame and diaphragm moving with respect to the microtip array, parallel to the diaphragm plane, in the course of read and/or write.

The flatness of the frame 1 must be compatible with the tolerance on the bearing force of the microtips 3, i.e. the same as the tolerance on the height dispersion of the microtips, which can be relatively large, as indicated above. For the same reasons, it is not necessary to have an exceptional flatness of the storage medium.

The diaphragm 2 has a low stiffness in the dimension normal to its plane, but it presents a large stiffness for tangential or lateral deformations, unlike cantilever structures which suffer from a large lateral flexibility able to limit the memory density, even if they are optimized with triangular shapes. This good geometric rigidity enables a precise positioning of the end of the microtips with respect to the surface of the diaphragm.

Unlike memories using a cantilever array, the size of the memory may be large, i.e. greater than 1 cm$^2$, to provide a larger data recording capacity.

Due to the flexibility of the diaphragm 2, an actuator (not shown), which moves the frame 1 bearing the diaphragm 2 constituting the storage medium, does not have to guarantee such a demanding precision as in devices using a cantilever array, in the dimension perpendicular to the plane of the diaphragm. A precision of about a few micrometers is sufficient, whereas a precision of about a nanometer is necessary in the prior art. This tolerance simplifies the design of the actuator enormously.

The device also presents a good tolerance as far as the roughness of the diaphragm 2 is concerned, the inherent flexibility of the latter enabling the roughnesses, deliberate or not, of the diaphragm to be absorbed, for example those constituted by patterning of the latter or by lines.

The device according to the invention can have a high density of microtips 3. Thus, in the prior art, the microtip arrays envisaged comprise 100×100 elements, with a 100 µm pitch, the size of the cantilevers and the presence of the tip addressing lines fixing the minimum pitch. In the device according to the invention, the cells can be much smaller (10 µm for example) due to the absence of cantilevers and to the arrangement of the addressing circuit with respect to the storage medium. It is thus possible to obtain memories with a high parallelism to reduce the access time thereof.

Figure 6:
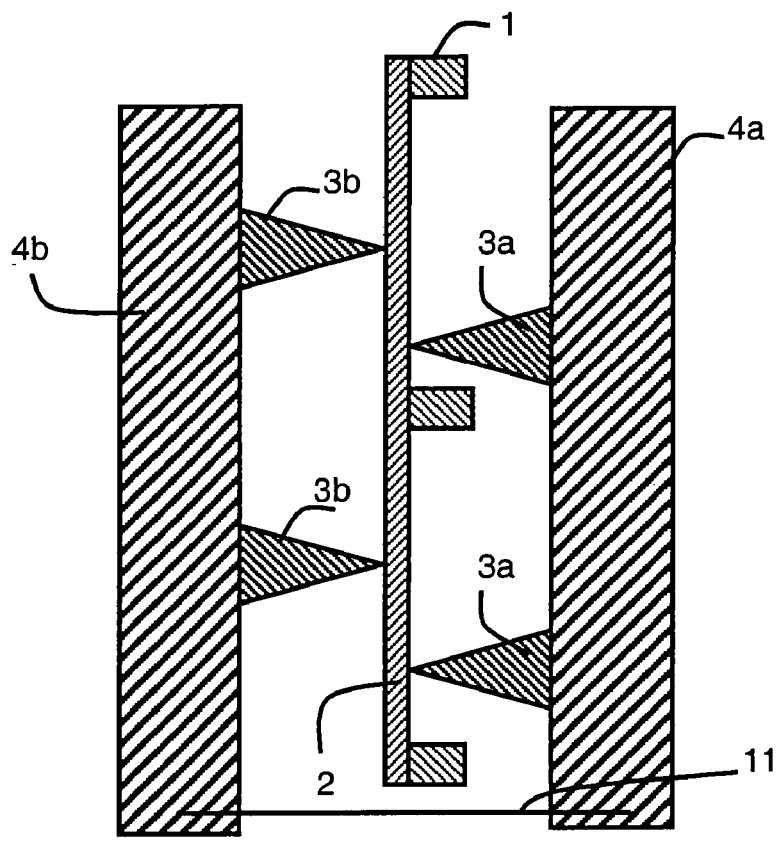
FIG. 6 represents, in cross-section, a device with a double array of microtips.

In the particular embodiment represented in FIG. 6, the memory capacity is doubled due to the use of the double-faced storage medium. The device then comprises two microtip arrays (3a, 3b) arranged on each side of the storage medium 2. The two microtip arrays 3a and 3b are preferably laterally offset so that the microtips 3a and 3b associated with any one cell of the frame are not located exactly facing one another.

In FIG. 6, the microtips 3a of a first microtip array are in contact with a face of the diaphragm 2 enabling read or write, under the control of the corresponding electronic circuit integrated in the base 4a, whereas the microtips 3b of the second microtip array, in contact with the opposite face of the diaphragm 2, enable read or write under the control of the corresponding electronic circuit integrated in the base 4b. The frame 1 or the two microtip arrays, preferably fixedly secured to one another by a connection 11 joining the bases 4a and 4b, can be moved in planes parallel to the plane of the diaphragm during the read or write operations under the control of the corresponding electronic circuits integrated in the bases 4a and 4b.

In an alternative embodiment, the microtips 3a of the first microtip array are in contact with the diaphragm 2, enabling read or write under the control of the corresponding electronic circuit integrated in the base 4a, whereas the microtips 3b of the second microtip array are at a slight distance from the diaphragm. Movement of the diaphragm support frame 1, perpendicularly to the plane of the diaphragm, in the direction of the second microtip array 3b, causes the microtips 3a of the first array to be moved away from the diaphragm, whereas the microtips 3b of the second array come into contact with the diaphragm enabling read or write, under the control of the corresponding electronic circuit integrated in the base 4b. The distance between the bases 4a and 4b can be chosen so that no microtip comes into contact with the diaphragm in a central rest position. Movement of the frame can be replaced by a simultaneous movement of the two microtip arrays, preferably secured to one another by their bases 4a and 4b (connection 11).

In another alternative embodiment, the bases 4a and 4b of the two microtip arrays are not secured to one another. They can be moved simultaneously and in opposite directions with respect to the storage medium. In a first, rest, position, the two bases 4a and 4b are separated from the plane of the frame 1, and no microtip is in contact with the diaphragm 2. In a second, read or write, position, the two bases 4a and 4b are moved in the direction of the storage medium and all the microtips 3a and 3b come into contact with the diaphragm, on both sides of the latter. Read and write of each of the faces of the storage medium are then, as in FIG. 6, controlled by the electronic circuits respectively integrated in the bases 4a and 4b.

The electronic control and addressing circuit situated in the base 4 can be achieved by means of any technology on silicon, the microtips 3 then being achieved by a microelectronics technology on silicon. The microtips can, for example, be made from silicon, possibly covered with a conducting and/or hard material, for example titanium nitride (TiN), tungsten carbide ($W_2C$) or amorphous diamond-carbon (diamond-like carbon, possibly doped to be conducting), as described in the article "Procédés de fabrication de micropointes en silicium", D. Moreau et al., Le Vide, n° 282, October-December 96, p. 463-477, ISSN 1266-0167 or in the article "Novel probes for scanning probe microscopy", E. Oestershulze, Applied Physics A 66, 1998, S3-S9.

To guarantee the absence of wear of the microtips, it is also envisageable to make them from solid diamond according to the process described in the article "Fabrication of monolithic probes for scanning probe microscopy applications", C. Mihalcea et al., Applied Physics A 66, 1998, S87-S90.

The storage medium is formed by a stack of layers constituting the flexible diaphragm 2. The stack of layers mainly comprises two layers, a first layer acting as memory and a second layer, called the mechanical layer, designed to provide the flexible diaphragm with a certain rigidity. The first layer, performing the function of memory, is made of a material dependent on the envisaged recording techniques, for example a thermoplastic material, phase change material, magnetic material, etc. Other layers can perform thermal or electrical functions if required, certain layers being able to contribute simultaneously to several functions.

Figure 7:
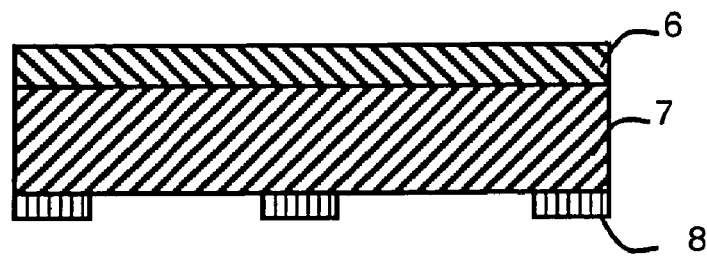
FIGS. 7 and 8 represent, in cross-section, two successive fabrication steps of the frame and of a part of the diaphragm of a device according to the invention.
Figure 8:
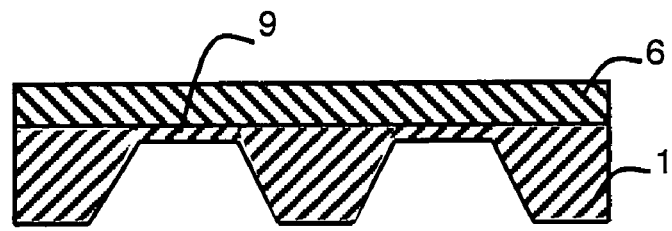

FIGS. 7 and 8 illustrate two successive fabrication steps of a silicon frame 1 and of the mechanical layer of the diaphragm borne by the frame 1. In a first step (FIG. 7), the mechanical layer 6 is deposited on a silicon layer 7 with a thickness of 100 to 500 µm, oriented (100). The mechanical layer 6 is for example formed by an amorphous carbon or diamond-like carbon (DLC) coating deposited on the silicon layer 7 by any known process, for example by chemical vapor deposition (CVD) or physical vapor deposition (PVD). The patterns of the cells are then achieved by photo-resist on the face of the silicon layer 7 opposite the mechanical layer 6 so as to form a resin mask 8.

The silicon layer 7 is then chemically etched, for example by potassium hydroxide (KOH) etching through the resin mask 8. Etching, performed according to preferred crystalline planes (111), is selective and stops on the mechanical layer 6 of the diaphragm. The remaining part of the silicon layer thus forms the frame 1 in which the cells are formed, the bottom whereof is constituted by the mechanical layer 6 of the diaphragm thus borne by the frame.

In the particular embodiment illustrated in FIG. 8, a residual layer of silicon is kept, in contact with the mechanical layer 6 of the diaphragm. This residual layer of silicon 9 enables the rigidity of the diaphragm to be increased or a specific mechanical contact to be achieved.

The other layers of the diaphragm, layer performing the function of memory and complementary packaging layers, can then be achieved on the mechanical layer 6. These layers could possibly be achieved before etching of the silicon layer 7. In this case, it is nevertheless necessary to protect them from the chemical etching, for example by means of an enclosure fixed tightly on the silicon layer 7.

Figure 9:
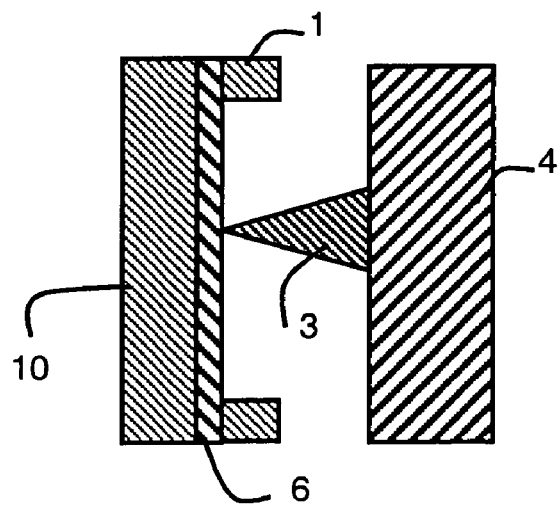
FIG. 9 illustrates, in cross-section, an alternative embodiment of FIG. 1.

In the alternative embodiment represented in FIG. 9, the first and second layers of the diaphragm (layer 10 performing the function of memory and mechanical layer 6) are represented, the microtip 3 coming into contact with the mechanical layer 6. This can enable, in certain cases, a significant bearing force to be had between the microtip and the storage medium, without however exerting any stress on the layer 10 performing the function of memory. Such a bearing force can prove interesting in particular in the case of electrical recording on a phase change material. The thickness of the mechanical layer 6 makes it possible to determine the force applicable without stressing the layer 10 performing the function of memory, deposited on the face of the mechanical layer opposite the face of the diaphragm in contact with the microtips 3.

The device according to the invention thus enables a choice to be made between a weak bearing force and a higher bearing force, according to the recording techniques used, which is not possible with a device using cantilevers.

In the above-described recording device, an edge effect may occur when a microtip 3 bears on the flexible diaphragm 2 near to the frame 1. In each cell, the flexibility of the storage medium in fact decreases from the center to the edge of the flexible diaphragm. It is possible to limit this effect by limiting the scanned surface to a fraction of the surface of the diaphragm of each cell. Such a limiting is however not optimal in terms of use of the storage medium.

Figure 10:
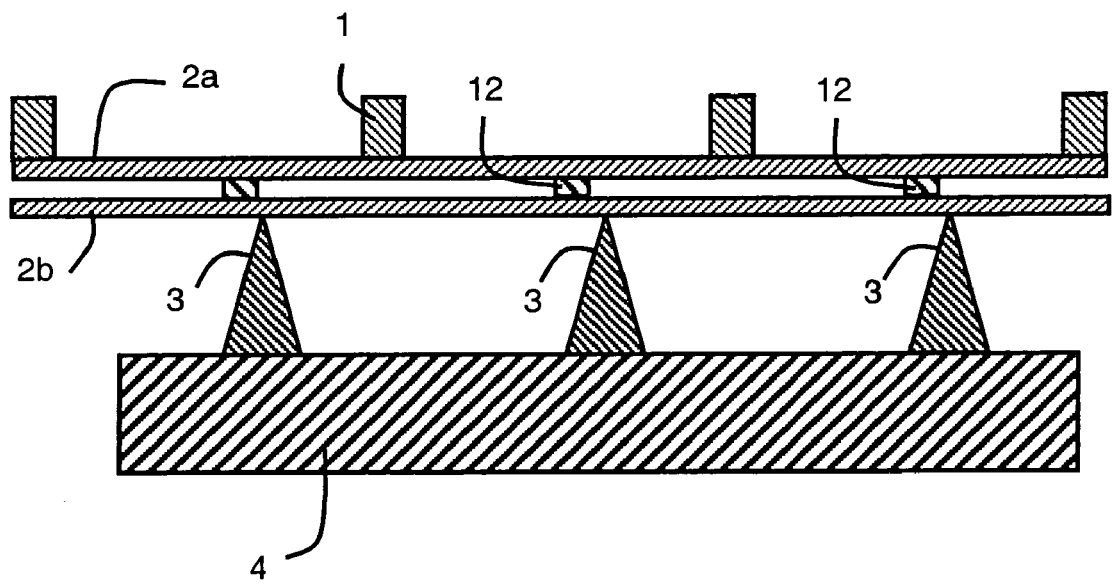
FIG. 10 represents another particular embodiment of a device according to the invention.
Figure 11:
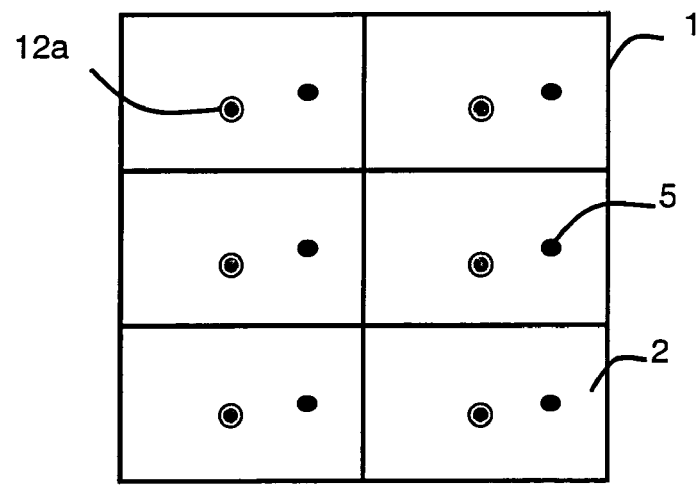
FIGS. 11 and 12 illustrate respective positions of different elements of two alternative embodiments of the device according to FIG. 10.
Figure 12:
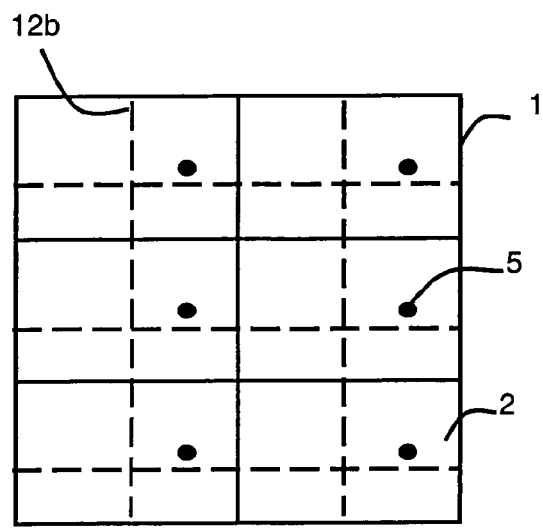

The particular embodiment represented in FIG. 10 enables this edge effect problem to be solved. In this device, the flexible diaphragm comprises a first elementary diaphragm 2a associated with the frame 1 as in FIG. 1, and a second elementary diaphragm 2b. The two elementary diaphragms 2a and 2b are separated by an array of spacer elements 12, which is offset with respect to the frame 1. The array of spacer elements can be formed by a plurality of individual spacer studs 12a (FIG. 11) or form an intermediate frame 12b (FIG. 12). The spacer elements 12 have a sufficient thickness to prevent contact between the two elementary diaphragms when deformation thereof takes place.

Thus, when a microtip 3 moves towards the frame bounding the edge of a cell, only the second elementary diaphragm 2b deforms and the bearing force remains low. When the microtip 3 comes to bear against the second elementary diaphragm 2b at the level of a spacer element 12, the deformation is transmitted to the first elementary diaphragm 2a at a location situated away from the frame 1 and consequently presenting a sufficient flexibility. In all cases, at least one of the elementary diaphragms ensures the flexibility sought for and compensates any height dispersion of the microtips. Thus, it is possible to eliminate any edge effect by using a double diaphragm with nested frames, formed by adding the second elementary diaphragm 2b, which is connected to the first elementary diaphragm 2a by spacer elements 12, only at locations laterally offset with respect to the frame.

This double diaphragm (2a, 12, 2b) can be achieved from a stacking comprising an alternation of silicon layers, designed to form the frame 1 and the spacer elements 12, and of thin layers of material of the type described above, designed to form the elementary diaphragms 2a and 2b. Such a stacking can be obtained by successive cuttings and stickings of silicon wafers by any known process, in particular by a process of the Smart Cut® type. The silicon can be removed by chemical etching by a process comparable with that described with reference to FIGS. 7 and 8 for fabrication of a single diaphragm. For this, openings are made in the first diaphragm 2a, by photo-masking, to enable isotropic etching, by chemical means, of the silicon layer designed to form the spacer elements 12. The first diaphragm 2a is then partially perforated.

Figure 13:
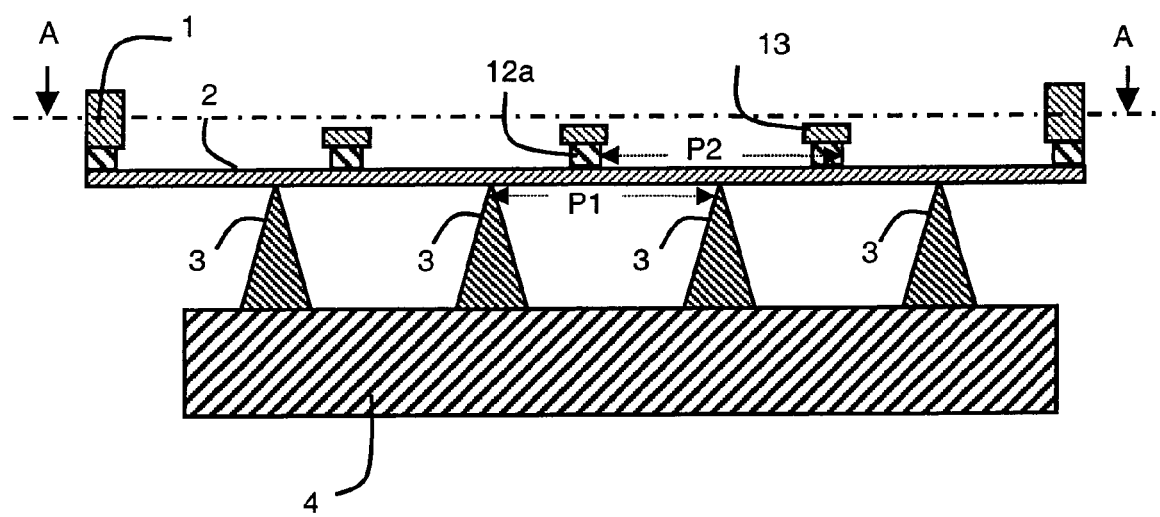
FIG. 13 represents another particular embodiment of a device according to the invention.
Figure 14:
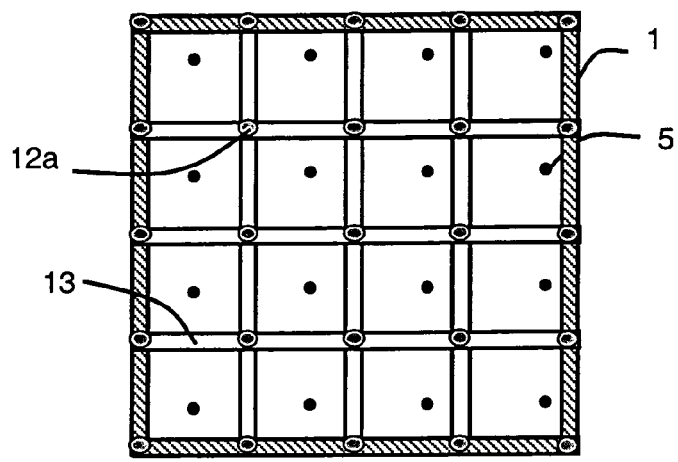
FIG. 14 illustrates the respective positions of different elements of an alternative embodiment of the device according to FIG. 13.

Another particular embodiment, illustrated in FIGS. 13 and 14, enables the edge effect caused when a microtip 3 bears on the flexible diaphragm 2 near to the frame 1 to be reduced. An array of thin flexible plates 13, separated from the diaphragm 2 by a two-dimensional array of spacer studs 12a, subdivides each cell into a plurality of elementary cells each associated with at least one microtip. Each cell can then have much larger dimensions than the pitch P1 of the microtip array (typically less than 100 µm) and its sides can measure for example up to 1 cm. In FIGS. 13 and 14, a substantially square cell bounded by the frame 1 is subdivided into 16 elementary cells by two perpendicular, criss-crossed series of three parallel plates 13. In practice, the number of microtips of the array being about ten thousand, the number of elementary diaphragms subdividing a cell can for example be about one hundred (10×10). The thickness of the plates 13 is much smaller than the thickness of the frame 1 (from 100 µm to 500 µm) so as to ensure a large flexibility of the storage medium inside each cell of large dimensions. The edge effect mentioned above can therefore only occur near to the frame 1, i.e. for a very limited number of microtips 3.

The flexibility of the plates 13 is a function of the cube of their thickness and proportional to their width. It also depends on their length between two fixed points, i.e. on their length between two spacer studs 12a. The latter dimension is a function of the pitch P1 of the microtip array. To enhance the flexibility of the plates 13, it is possible to associate several microtips with each elementary cell. The flexibility of the assembly can also be enhanced by choosing, for the array of spacer studs, a slightly different pitch P2 from the pitch P1 of the microtip array, preferably in the two dimensions of the storage medium plane, as represented in FIGS. 13 and 14. In this case, when a microtip 3 is situated facing a spacer stud 12a, the closest microtips are offset with respect to the adjacent spacer studs. It is then the flexibility proper to the diaphragm 2 which absorbs the height differences of the microtips 3.

According to the fabrication process of a device with plates according to FIGS. 13 and 14 illustrated in FIGS. 15 to 18, the frame 1 and plates 13 are formed in a single layer 14 of silicon, from 100 µm to 500 µm thick, located on a silicon dioxide layer 15 having a thickness of 50 nm to 500 nm, designed for formation of the spacer studs 12a, itself deposited on the diaphragm 2. This layer 15 can also be made of silicon nitride or of carbon.

Figure 15:
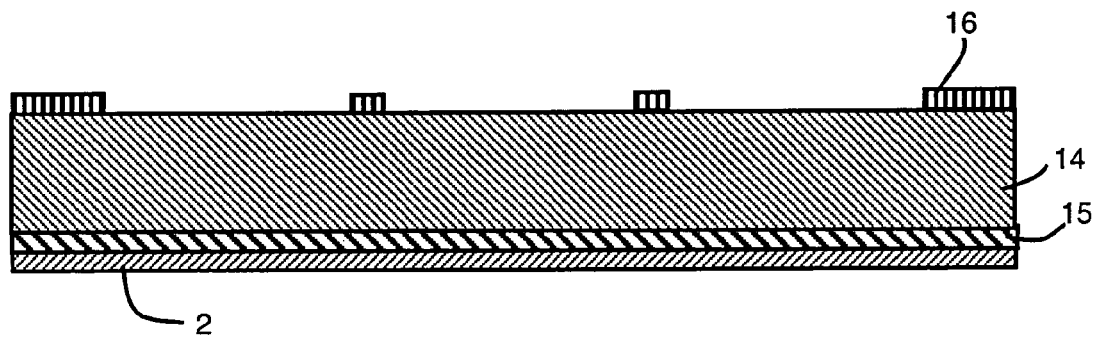
FIGS. 15 to 18 represent the successive steps of a process for achieving a device according to FIGS. 13 and 14.
Figure 16:
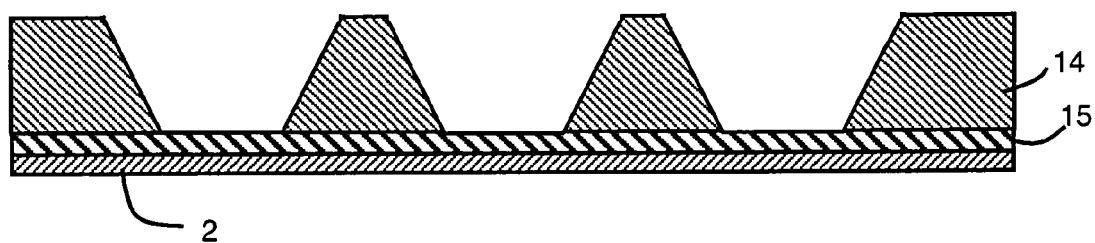
Figure 17:
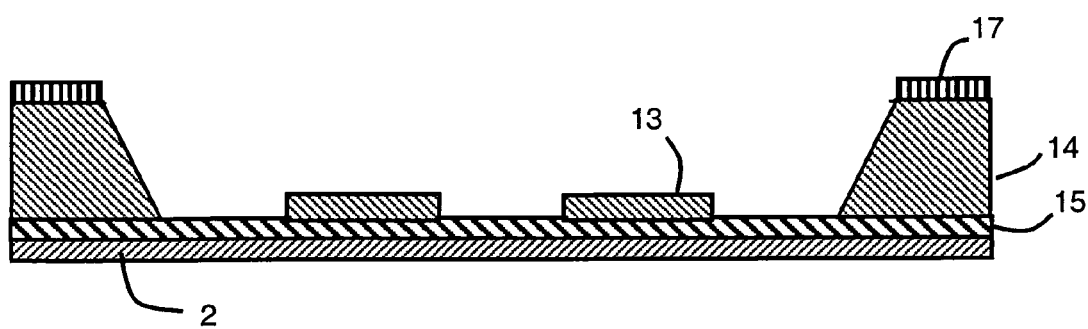
Figure 18:
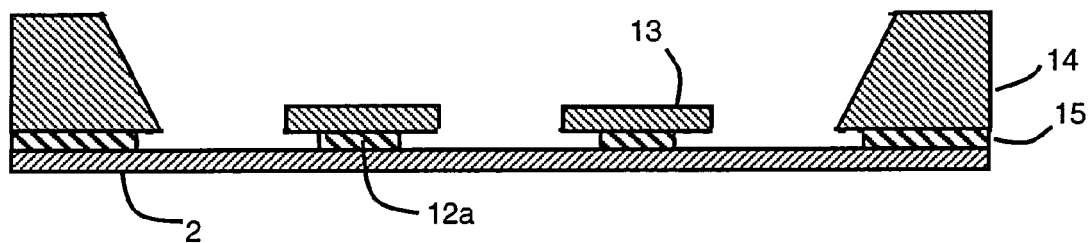

In a first step, illustrated in FIGS. 15 and 16, the silicon layer 14 is etched anisotropically through a mask 16 protecting the location of the frame 1 and plates 13. In a second step, illustrated in FIG. 17, the plates 13 are thinned by selective isotropic etching of the silicon layer 14 through a mask 17 protecting the frame 1 only. In a last step, represented in FIG. 18, the spacer studs 12a are disengaged by selective isotropic etching of the layer 15 through a mask (not shown), the zones whereof situated facing the spacer studs have been enlarged with respect to the corresponding zones of the mask 16 of FIG. 15 used in the course of the first step. This makes it possible to prevent an overetching effect, which would reduce the formation of the islands constituted by the spacer studs 12a.

As in the previous embodiments, the diaphragm 2 can for example be formed by stacking of a mechanically rigid layer, for example made of amorphous diamond-like carbon (DLC) and a layer performing the memory function (plastic, phase change material, . . . ). The latter layer may be deposited after the third step of FIG. 18, the initial stacking of FIG. 15 then only comprising the rigid mechanical layer, for example with a thickness of 100 nm, of the diaphragm 2.

The invention is not limited to the particular embodiments described above. In particular the flexible diaphragm 2 can comprise a layer made from diamond-like carbon, silicon, silicon oxide ($SiO_2$) or even metal. If electrical conduction of the diaphragm 2 is required, the mechanical layer 6 of the diaphragm 2 can be doped, for example by boron or silver.

The invention claimed is:

1. Data recording device comprising:
    a two-dimensional array of microtips attached directly to a fixed, rigid base and arranged in a plane opposite a storage medium, and
    electronic means for addressing and controlling the microtips so as to enable data recording on the storage medium,
    the storage medium comprising a flexible diaphragm borne by a frame laterally, delimiting a plurality of cells, at least one micro-tip being associated with each cell,
    the flexible diaphragm comprises two free faces parallel to the plane.

2. Device according to claim 1, wherein the microtips have an apex of nanometric dimensions.

3. Device according to claim 1, wherein the cells are rectangular.

4. Device according to claim 1, wherein the cells are hexagonal.

5. Device according to claim 1, comprising two arrays of microtips arranged on each side of the storage medium.

6. Device according to claim 5, wherein the two arrays of microtips are laterally offset so that the microtips associated with any one cell of the frame are not arranged exactly opposite one another.

7. Device according to claim 1, wherein the frame is formed by a silicon layer in which the cells are formed.

8. Device according to claim 1, wherein the flexible diaphragm comprises at least a first layer, performing the function of a memory, and a second layer designed to ensure a certain rigidity.

9. Device according to claim 8, wherein the second layer is an amorphous carbon or diamond-like carbon layer deposited on a silicon layer before formation of the cells is performed on the opposite face of the silicon layer.

10. Device according to claim 9, wherein the second layer is doped by boron or silver.

11. Device according to claim 1, wherein the flexible diaphragm comprises first and second elementary diaphragms separated by an array of spacer elements laterally offset with respect to the frame.

12. Device according to claim 11, wherein the array of spacer elements constitutes an intermediate frame.

13. Device according to claim 12, wherein the spacer elements are formed by studs.

14. Device according to claim 1, comprising an array of flexible plates, separated from the diaphragm by a two-dimensional array of spacer studs and sub-dividing each cell into a plurality of elementary cells each associated with at least one microtip.

15. Device according to claim 14, wherein the number of microtips of the array being about ten thousand, the number of elementary cells subdividing a cell is about one hundred.

16. Device according to claim 14, wherein the array of microtips has a slightly different pitch from that of the array of spacer studs.

17. Device according to claim 14, wherein the frame and plates are formed in a silicon layer having a thickness of 100 µm to 500 µm.

18. Device according to claim 11, wherein the spacer elements or studs are made of silicon dioxide, silicon nitride or carbon, with a thickness of 50 nm to 500 nm.

19. Device according to claim 1, comprising means for relative movement of the storage medium and of the microtip array, in a direction parallel to said plane.

* * * * *